US011630237B2

(12) United States Patent
Bonnet et al.

(10) Patent No.: US 11,630,237 B2
(45) Date of Patent: Apr. 18, 2023

(54) ADAPTIVE METHOD AND DEVICE FOR PREDICTION OF A WEATHER CHARACTERISTIC OF A SURFACE OF A ROAD SEGMENT

(71) Applicant: Continental Automotive GmbH, Hannover (DE)

(72) Inventors: Jonathan Bonnet, Toulouse (FR); Nicolas Renard, Toulouse (FR); Christophe Adonis, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/785,604

(22) PCT Filed: Jan. 4, 2021

(86) PCT No.: PCT/EP2021/050022
§ 371 (c)(1),
(2) Date: Jun. 15, 2022

(87) PCT Pub. No.: WO2021/144158
PCT Pub. Date: Jul. 22, 2021

(65) Prior Publication Data
US 2023/0026008 A1    Jan. 26, 2023

(30) Foreign Application Priority Data
Jan. 13, 2020    (FR) ...................................... 2000249

(51) Int. Cl.
*G06F 11/30*    (2006.01)
*G01W 1/10*    (2006.01)

(52) U.S. Cl.
CPC .................................. *G01W 1/10* (2013.01)

(58) Field of Classification Search
CPC ........................................................ G01W 1/10
See application file for complete search history.

(56) References Cited

U.S. PATENT DOCUMENTS

2011/0029243 A1\*  2/2011  Gallagher ............... G01W 1/00
  702/3
2017/0349148 A1\*  12/2017  Bojanowski ........... G01C 21/28

FOREIGN PATENT DOCUMENTS

EP          3480629          5/2019

OTHER PUBLICATIONS

English Translation of the Written Opinion for International Application No. PCT/EP2021/050022, dated Apr. 6, 2021, 5 pages.

(Continued)

*Primary Examiner* — Phuong Huynh
(74) *Attorney, Agent, or Firm* — RatnerPrestia (57) ABSTRACT

An adaptive method and device for predicting a weather-related characteristic of a surface of a segment of a road network. The method includes obtaining a location and of measuring a weather-related characteristic of the surface of the roadway of a road segment on which a measuring vehicle is traveling; predicting a weather-related surface characteristic of the road segment using a weather-observation history and a first prediction model associated with the road segment; associating a second prediction model with the road segment when a difference between the measured characteristic and the predicted characteristic is greater than a threshold; and transmitting to a vehicle a prediction made by applying the associated model to the weather-observation history.

8 Claims, 2 Drawing Sheets

(56) References Cited

OTHER PUBLICATIONS

International Search Report and Written Opinion for International Application No. PCT/EP2021/050022, dated Apr. 6, 2021, with partial English translation, 8 pages.
International Search Report and Written Opinion for International Application No. PCT/EP2021/050022, dated April 6, 2021, 11 pages (French).

* cited by examiner

Fig. 4

ADAPTIVE METHOD AND DEVICE FOR PREDICTION OF A WEATHER CHARACTERISTIC OF A SURFACE OF A ROAD SEGMENT

CROSS REFERENCE TO RELATED APPLICATIONS

This application is the U.S. National Phase Application of PCT International Application No. PCT/EP2021/050022, filed Jan. 4, 2021, which claims priority to French Patent Application No. 2000249, filed Jan. 13, 2020, the contents of such applications being incorporated by reference herein.

FIELD OF THE INVENTION

The invention relates to prediction of the surface conditions of the roadway of a road segment. It in particular relates to an adaptive method for predicting weather-related surface conditions on a particular road segment.

BACKGROUND OF THE INVENTION

Weather conditions at the surface of a road network have a considerable impact on the behavior and safety of vehicles. Specifically, the grip of a vehicle to the roadway is highly related to weather-related surface conditions of the roadway, braking distances potentially being substantially increased depending on whether the roadway is dry, wet, icy or snow-covered.

Localized events, such as for example patches of black ice or large amounts of water, may also surprise motorists.

In order to predict surface conditions and improve road safety, various systems have been proposed.

For example, systems are known that use weather data obtained from fixed weather stations distributed over the road network to establish a map of weather-related road-network surface conditions. Such weather stations comprise, for example, cameras or other sensors suitable for measuring a level of any water on the roadway. This data can thus be transmitted to other vehicles traveling on the network, in order to inform motorists about possible risk areas.

The investments required to implement such a solution, and in particular the cost of installing weather stations on the road network, are a hindrance to its implementation. Thus, other methods have been proposed. For example, methods are known that use thermodynamic models allowing the state of the roadway to be predicted on the basis of weather observations. Such models may for example predict an amount of water on the roadway or its temperature at a given time on the basis of measurements of precipitation and of atmospheric conditions such as ambient temperature, insolation and wind speed.

These techniques thus allow the number of weather stations required on the road network to be limited. However, since these thermodynamic models are specific to one particular type of roadway, they may prove to be incapable of making reliable predictions in the event of modification of the characteristics of the roadway. However, the characteristics of a roadway vary over time: growth of surrounding vegetation, the presence of sludge or even progressive wear of the roadway may, for example, have an influence on the drying time of a road after a downpour and make a given thermodynamic model inappropriate.

Thus, there is a need for an adaptive predicting solution that will allow weather-related road-segment surface conditions to be reliably predicted even in the event of local modification of the environment.

SUMMARY OF THE INVENTION

To this end an adaptive method for predicting a weather-related characteristic of a surface of a segment of a road network is provided, the method being such that it comprises the following steps:
receiving, from a measuring vehicle,
a location of the measuring vehicle, and
a second weather-related characteristic of the surface of the road segment, which second characteristic is measured by a sensor of the measuring vehicle at said location,
determining a road segment on which the first vehicle is traveling on the basis of the received location,
selecting, from a plurality of prediction models, a first prediction model associated with the determined road segment,
predicting a first weather-related surface characteristic by applying the first prediction model to a weather-observation history obtained for the determined segment,
computing a first value $E1$ representative of the difference between the first weather-related characteristic predicted for the road segment and the second weather-related characteristic measured by the measuring vehicle, and
when the computed first value $E1$ is greater than a first threshold:
predicting a second weather-related characteristic by applying at least one second prediction model to the weather-observation history of the determined segment,
computing a second value $E2$ representative of the difference between the weather-related characteristic measured by the measuring vehicle and the predicted second weather-related characteristic,
when the second value $E2$ is less than the first value $E1$, associating the second prediction model with the road segment,
transmitting, to at least one second vehicle traveling on the segment, a weather-related surface characteristic predicted by applying the prediction model associated with the segment to the weather-observation history of the segment.

Each segment of a road network is associated with one prediction model trained specifically to predict weather-related surface conditions of the segment with which it is associated. Since each road segment is associated with one specific prediction model, depending for example on the type of pavement or the topography of the site, the method allows particularly reliable predictions to be obtained. The method proposes to employ a more relevant alternative prediction model when the predictions made for the segment do not correspond to observations made by inspection vehicles.

When a vehicle wishes to obtain a prediction of the weather-related surface conditions of a road segment on which it is traveling, the model associated with the segment is applied to a weather-observation history of the road segment. The observations of such a history are for example supplied by a local weather-observation service and/or by a second vehicle traveling on the segment.

In order to guarantee the reliability of the predictions, it is proposed to evaluate the performance of the prediction model by comparing the prediction with observations made by one or more measuring vehicles traveling on the segment.

To this end, it is proposed to compute a value representative of a difference between the observations measured by the measuring vehicle and the prediction of the model associated with the segment.

When the computed difference is greater than a first threshold, it is proposed to make new predictions using alternative prediction models selected according to a selection strategy that for example consists in selecting models associated with road segments of the same type, or of neighboring type. When at least one of the alternative models predicts a weather-related surface characteristic that is similar to the observations of the measuring vehicle, this alternative model is associated with the segment instead of the first model. Thus, when a model is no longer able to predict a weather-related surface condition with sufficient reliability, a better model is associated with the segment.

Thus, say for example maintenance services have replaced the pavement of the roadway, the model initially associated with the segment will no longer work and an alternative model, for example a model trained to predict weather-related surface conditions on a new roadway, and therefore more suited to the new conditions of the segment, will be selected and associated with the segment.

The method is thus capable of adapting to changes that may occur on a road segment. The reliability of the predictions over time is thus increased and these predictions may be used by vehicles to travel more safely.

In the present description, a road segment corresponds to a section of a road comprised between two intersections. However, when the distance separating two consecutive intersections is greater than a predefined distance, the section is subdivided into segments of a predefined maximum length, into segments of one hundred meters for example.

By weather-related surface characteristic what is meant is a consequence (such as a water level, the presence of ice or snow) of weather conditions on the surface of the roadway.

The weather-observation history of the determined segment, on the basis of which the surface characteristic is predicted, comprises observations or forecasts that were made in a predefined time window preceding the date of training or prediction. For example, this time window contains weather observations made over the 3 days preceding the measurement of a surface characteristic in the case of training, or over the 3 days preceding the time at which a prediction is made.

In the following description, a "prediction model" is a supervised-learning model such as an artificial neural network.

In one particular embodiment, when the first value E1 is less than or equal to the second value E2, and comprised between the first threshold S1 and a second threshold S2, the first prediction model is retrained using the weather-observation history of the segment and surface characteristics measured by the measuring vehicle.

Thus, when no alternative model is better than the first model for the segment, and when the difference between the prediction of the first model and the observations of the measuring vehicle is less than a second threshold, i.e. when the prediction does not differ excessively from the observations, it is proposed to use the observations made by the measuring vehicle to retrain the first model associated with the segment. The method thus makes it possible to adapt the predictions to minor and/or gradual changes that may occur on the segment in question, such as a modification of insolation due to a change of season.

According to one particular embodiment, when the first value E1 is less than or equal to the second value E2 and greater than the second threshold S2, the method further comprises the following steps:
   training a third prediction model using a plurality of weather-observation histories and a plurality of surface characteristics measured by at least one measuring vehicle, and
   associating the third model with the road segment.

When the predictions of the model associated with the road segment exhibit a particularly significant difference with respect to the observations of the measuring vehicle, and when none of the selected alternative models was able to predict with sufficient accuracy the weather-related characteristic measured by the measuring vehicle, a new prediction model is trained using the measurements and observations made on the segment, then this new prediction model is associated with the segment.

In this way, the method makes it possible to guarantee that the predictions will be reliable, even when the characteristics of a road segment change in such a way that the available models are no longer appropriate.

According to one particular embodiment, the first and second thresholds are defined depending on a value representative of the reliability of the measurement of the second weather-related surface characteristic by the measuring vehicle.

A "value representative of the reliability" is for example a margin of error of the sensor with which the measuring vehicle is equipped, which margin is given by the manufacturer of the sensor or determined by the conditions of use of the sensor.

As a variant or in combination with the value representative of the reliability of the measurement, the first and second thresholds are weighted by a confidence index determined for the model associated with the segment. The confidence index is for example incremented when the difference between a prediction made by the model associated with the segment and the characteristic measured by a measuring vehicle is less than the first threshold, and decremented when the difference is greater than the first threshold.

Thus, the thresholds defining the acceptability of a prediction vary as a function of the reliability of the field observations.

According to one particular embodiment, the duration of the time window varies as a function of a contextual datum.

Thus, for example in winter, the history may comprise weather observations made over a period of six days, whereas in summer the duration of the time window may be decreased.

Such a measure allows seasonal specificities, such as for example a layer of snow lasting several days in winter, or rapid drying of the roadway after a shower in summer, to be taken into account. The learning phase is thus optimized.

According to another aspect, the invention relates to an adaptive device for predicting a weather-related characteristic of a surface of a segment of a road network, comprising a communication interface, a processor and a memory, the processor and the communication interface being configured by instructions stored in the memory and being configured to implement the following steps:
   receiving, from a measuring vehicle,
      a location of the measuring vehicle, and a second weather-related characteristic of the surface of the road segment, which second characteristic is measured by a sensor of the measuring vehicle at said location, determining a road segment on which the first vehicle is traveling on the basis of the received location, selecting, from a plurality of prediction models, a first prediction model associated with the determined road segment, predicting a first weather-related surface characteristic by applying the first prediction model to a weather-observation history obtained for the determined segment, computing a first value E1 representative of the difference between the first weather-related characteristic predicted for the road segment and the second weather-related characteristic measured by the measuring vehicle, and when the computed first value E1 is greater than a first threshold:
   predicting a second weather-related characteristic by applying at least one second prediction model to the weather-observation history of the determined segment,
   computing a second value E2 representative of the difference between the weather-related characteristic measured by the measuring vehicle and the predicted second weather-related characteristic, when the second value E2 is less than the first value E1, associating the second prediction model with the road segment, transmitting, to at least one second vehicle traveling on the segment, a weather-related surface characteristic predicted by applying the prediction model associated with the segment to the weather-observation history of the segment.

According to yet another aspect, the invention relates to a server comprising such a predicting device.

Lastly, an aspect of the invention relates to a processor-readable data medium on which is stored a computer program comprising instructions for executing the steps of a predicting method such as described above.

The data medium may be a nonvolatile data medium such as a hard disk, a flash memory or an optical disk for example.

The data medium may be any entity or device capable of storing instructions. For example, the medium may comprise a storage means, such as a ROM, RAM, PROM, EPROM, a CD ROM or even a magnetic recording means, for example, a hard disk.

Furthermore, the data medium may be a transmissible medium such as an electrical or optical signal, which is able to be routed via an electrical or optical cable, by radio or by other means.

Alternatively, the data medium may be an integrated circuit, in which the program is incorporated, the circuit being able to execute or to be used in the execution of the method in question.

The various aforementioned embodiments or features may be added, independently of or in combination with one another, to the steps of the predicting method.

The devices, servers and data media have at least advantages analogous to those conferred by the method to which they relate.

BRIEF DESCRIPTION OF THE DRAWINGS

Further features, details and advantages of an aspect of the invention will become apparent upon reading the following detailed description and upon analyzing the appended drawings, in which.

DETAILED DESCRIPTION OF ONE EMBODIMENT

Figure 1:
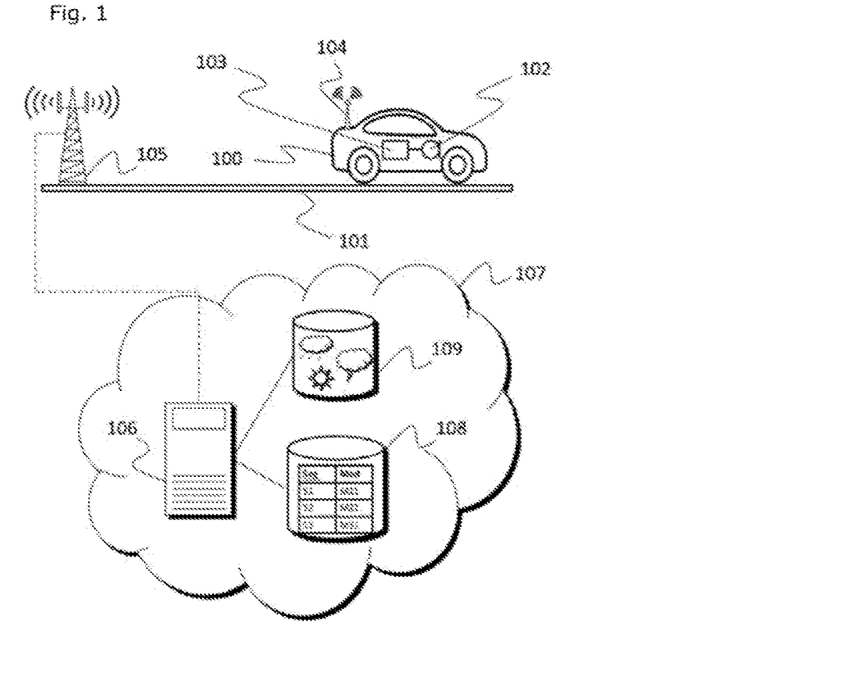
FIG. 1 shows an environment suitable for implementation of the method according to one particular embodiment.

FIG. 1 shows a measuring vehicle 100 traveling on a road segment 101. The vehicle 100 is able to determine a surface condition of the roadway on which it is traveling. For example, the vehicle comprises a microphone 102 connected to a processing unit 103 such as an electronic control unit (ECU). The processing unit 103 comprises a signal-processing software package that is able to determine an amount of water on the roadway on the basis of the audio signal captured by the microphone 102.

The vehicle 100 also comprises communication means 104, for example a 2G, 3G, 4G, WiFi, WiMAX or LTE cellular network interface allowing it to exchange messages with other devices via a cellular access network 105. In particular, the vehicle 100 is able to exchange messages with a server 106 of a communication network 107.

The server 106 comprises communication means, such as an Ethernet network interface, allowing it to exchange messages with other devices, and in particular with the vehicle 100. The server 106 also comprises a processor, and a memory in which computer-program instructions are stored. The instructions are configured to implement the adaptive predicting method according to one particular embodiment, when they are executed by the processor.

The server 106 has access to databases 108 and 109. The databases 108 and 109 may be local to the server or indeed remote and accessible through the communication network 107.

The database 109 contains a history of weather observations associated with geographical locations. Such weather observations are for example supplied by providers of weather forecasts or observations for various geographical locations. In this way, the server 106 may for example obtain, by suitably querying the database 109, a history of precipitation on the segment 101, or on any other segment of a road network.

The database 108 contains records allowing each given segment of a road network to be associated with at least one particular prediction model. For example, the segment 101 is associated with one particular prediction model suitable for predicting weather-related surface conditions of the segment 101 on the basis of the history of weather-related surface conditions observed for the segment 101.

Figure 2:
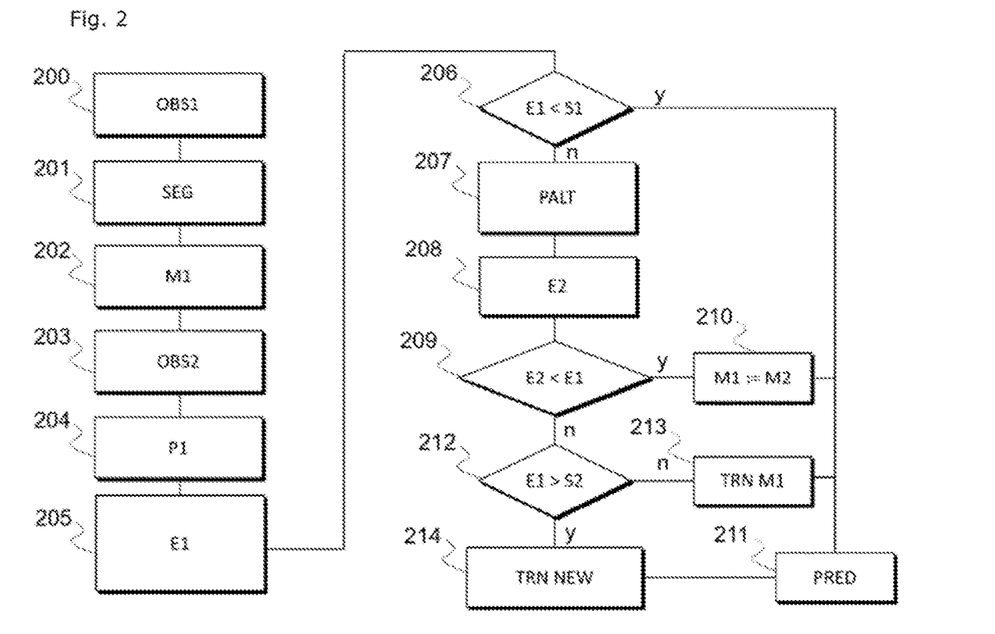
FIG. 2 is a flowchart illustrating the main steps of the method according to one particular embodiment.

The adaptive predicting method will now be described with reference to FIG. 2.

In a first step 200, the server 106 receives a location datum from the measuring vehicle 100, for example GNSS (global navigation satellite system) coordinates comprising a latitude and a longitude, and a weather-related surface characteristic measured by the vehicle at the spot designated by the location datum. These data are received via the communication means of the server 106, for example in the form of a message in JSON (JavaScript Object Notation) or XML (Extensible Markup Language) format, or in any other suitable format. The message further contains a timestamp datum corresponding to the date and time at which the measurement was taken.

On the basis of the received location datum, the server 106 determines, in a step 201, a road segment on which the measurement of the surface characteristic was taken. To this end, the server 106 matches the received GNSS coordinates with a digital representation of the road network, so as to determine a segment containing the point designated by the GNSS coordinates. Such a step can be carried out using a known "map-matching" technique.

In this way, the server 106 determines the weather-related surface conditions on one particular segment of the road network.

In step 202, the server 106 consults the database 108 with a view to determining a prediction model associated with the road segment identified in step 201. To this end, the server makes a query, for example an SQL (Structured Query Language) query containing an identifier of the segment in order to obtain in reply an identifier of the prediction model associated with the identifier of the segment. In one particular embodiment, the query further contains a criterion of selection of the prediction model, a date for example. In this way, when a plurality of prediction models are associated with the same road segment, the model is selected depending on this criterion. Thus, for example, a particular model may be selected depending on whether it is summer or winter.

The prediction models with which the segments of the road network are associated are trained in order to predict, on the basis of a weather-observation history, a surface condition of the segment. To this end, one particular segment is associated with one particular prediction model depending on a characteristic of the segment, for example, non-exhaustively, depending on the type of pavement (recent asphalt, old asphalt, concrete, paving stones, etc.), the type of road (freeway, ring road, secondary network), the environment (forest, mountain, plain, etc.) or even a geographical region.

In a step 204, the prediction model associated with the segment is inferred using a weather-observation history to obtain a first prediction P1. The weather-observation history is obtained from a database 109 or from a weather-forecast provider in an obtaining step 203. The obtained observations are comprised in a time window of determined duration immediately preceding the date and time at which the measuring vehicle 100 measured the weather-related surface characteristic received in step 200. For example, the history comprises weather observations over the 3 days preceding the measurement time. The server 106 obtains the observation history, for example by sending an SQL query to a database 109 in which the weather observations are stored, the SQL query containing a start date and an end date of the time window. As a variant, the server may interrogate a server of a weather-forecast provider, for example by means of a suitable http request, in parameters of which the start and end times of the period in question are provided, and in reply to which the server receives, for example in the form of a JSON, CSV (comma-separated values) or XML file, a plurality of weather observations.

According to one particular embodiment, the duration of the time window corresponding to the weather-observation history varies depending on a context datum. The context datum is for example a period of the year and/or a geographical region. Thus, in winter for example, the prediction model is inferred using weather observations relating to the last six days, whereas in summer, it is inferred using observations relating to the last three days. Of course, historical periods of other durations may be used without modifying the method.

In step 205, the server 106 computes a difference E1 between the prediction made in step 204 on the basis of the observations obtained in step 203 and the weather-related surface characteristics measured and transmitted by the measuring vehicle 100 in step 200. This difference for example corresponds to the discrepancy between the water level measured by the vehicle 100 and the water level predicted in step 204 by the model on the basis of the weather observations, or even to the difference between a temperature of the surface of the roadway of the segment 101 and a predicted temperature, or to any value representative of a difference between the prediction of a surface characteristic of the segment 101 and a measurement of this characteristic by the vehicle 100.

In one particular embodiment, the value E1 representative of a difference between the forecast of the model and the weather observations is a conditional probability of one particular prediction P1 given the weather observations measured by the vehicle and obtained in step 200. Such a probability is representative of the reliability with which the model is able to predict a surface characteristic under particular conditions, those of a wet road for example. When the values representative of a difference between the predictions and the observations are probabilities, the terms of the comparisons made in steps 206, 209 and 212 such as described below may be inverted without modifying an aspect of the invention. Specifically, when the value E1 is a probability, a value of 1 indicates a particularly reliable model, whereas when the value E1 corresponds for example to a difference in water level, a value of zero indicates a reliable model.

In a step 206, the server compares the difference E1 computed in step 205 with a first threshold S1, for example a threshold of 5%.

According to one particular embodiment, the first threshold S1 is defined depending on a value representative of the reliability of the measurement of the second weather-related surface characteristic by the measuring vehicle. To this end, the message received by the server 106 from the measuring vehicle in step 200 contains a reliability value of the measurement taken by the sensor of the vehicle. Such an indicator for example depends on the sensor model used or on the conditions of use of the sensor. The reliability value for example corresponds to a margin of error given by the manufacturer of the sensor or to a measurement uncertainty determined by the sensor.

When the value representative of the difference E1 is greater than or equal to the first threshold S1, i.e. when the prediction made by the current model does not correspond to the observations made by the vehicle, the server infers at least one alternative prediction model in a step 207, on the basis of the weather-observation history associated with the segment 101. The alternative prediction model is a model that is different from the model associated with the segment 101, and it is selected from the models associated with other road segments of the road network. The alternative model is selected depending on a criterion of similarity with the segment 101, or indeed depending on a context datum, such as a period of the year. For example, the server 106 selects a prediction model associated with a road segment the pavement of which is similar to the pavement of the segment 101 but older. To this end, the prediction models associated with segments of the road network may be arranged according to a criterion of similarity in a vector or a matrix in such a way that the alternative models are selected from the neighbors of the model in the vector or the matrix in question.

Figure 3:
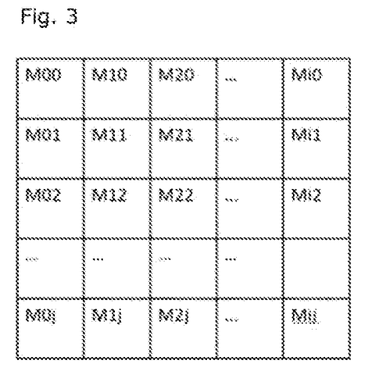
FIG. 3 shows an example of an arrangement of prediction models in the form of a two-dimensional matrix.

FIG. 3 shows a two-dimensional matrix containing identifiers of prediction models M00 to Mij. In this example of a matrix, each column corresponds to one type of pavement and each row corresponds to one degree of wear of the pavement. For example, in the first column, models M00 to M0j correspond to prediction models trained to predict a weather-related surface characteristic for pavements of "paving stone" type, the model MOO being associated with a new pavement while the model M0j is associated with a very old pavement. In the second column, models M10 to M1j correspond for example to a pavement of "concrete" type, etc., etc. Thus, the models are organized in the matrix in such a way that two neighboring models are suitable for predicting weather-related surface characteristics for pavements possessing similar properties. Of course, the models may be organized according to different criteria in a matrix possessing more than two dimensions.

Thus, if for example model M11 is associated with the segment 101, the server will select the neighboring alternative models MOO, M10, M20, M21, M22, M12, M02 and M01. The server infers each of the selected alternative models using the weather-observation history obtained in step 203, to obtain a plurality of alternative predictions.

According to one particular embodiment, at least one alternative model is selected, from a plurality of alternative models, depending on the value of a confidence index associated with each of the plurality of models. The confidence index is representative of the capacity of a model to accurately predict a surface characteristic for a particular segment.

The confidence index of a model associated with the segment 101 is increased when the model makes predictions that correspond to the observations of the vehicle. For example, the confidence index is modified in step 206 depending on the result of the comparison of the difference value E1 with the threshold S1. If the difference E1 is less than the first threshold S1, the server increments a confidence value associated with the model. Conversely, if the difference E1 is greater than or equal to the first threshold S1, the confidence index is decreased. In this way, the confidence index is representative of the relevance of a model to prediction of a surface characteristic on the segment 101. The database 108 thus stores a confidence index in association with each prediction model and with at least one segment. Thus, when a model no longer makes satisfactory predictions for a particular road segment, it is replaced by the alternative model the confidence index of which, in respect of predictions of a surface characteristic of this segment, is the highest.

In step 208, the server 106 computes a second value E2 representative of the difference between the weather-related surface characteristic measured by the measuring vehicle 100 and the weather-related characteristics predicted by each of the selected alternative models. The server thus determines a value E2 representative of the difference between the weather-related surface characteristic measured by the measuring vehicle 100 and the weather-related characteristics predicted by the alternative model that made the prediction closest to the observations of the vehicle 100. The difference is computed using a technique similar to that described with reference to step 205.

The server 106 compares the second difference value E2 with the first difference value E1 in a step 209. When the difference value E2 is less than the difference value E1, i.e.

when at least one model among the selected alternative models made a prediction better than that of the model associated with the segment, the server associates with the segment 101 the alternative model that made the prediction closest to the observations of the vehicle 100. A better model is thus associated with the segment 101 in a step 210, replacing the previously associated model. The new association is updated in the database 108 so that new predictions for the segment 101 are made by the newly associated model.

Lastly, in step 211, the server 106 transmits, to at least one second vehicle traveling on the segment 101, a weather-related characteristic of the surface of the segment 101, said characteristic being predicted by applying the prediction model associated with the segment to the weather-observation history of the segment. To this end, the server for example receives a prediction request from a second vehicle, a passenger vehicle for example, traveling on the segment 101. The prediction request contains the location of the vehicle, on the basis of which the server is able to determine the road segment, as described above. The server 106 obtains the prediction model associated with the segment by consulting the database 108. The prediction model associated with the segment 101 will for example have been updated in steps 200 to 210 described above. The server may then transmit to the second vehicle a message containing the predicted surface characteristic.

According to one particular embodiment, the server infers a plurality of models associated with the segments comprised in a particular region of a road network, using a weather-observation history of these various segments. On the basis of the predictions thus obtained, the server may update a digital map comprising weather-related surface conditions for each segment of a particular region of a road network. Such a map is transmitted to at least one second vehicle traveling through said particular region.

According to one particular embodiment, when at the end of step 209 the server observes that the difference value E2 is greater than the difference value E1, i.e. when none of the selected alternative models is able to provide a prediction better than that of the prediction model already associated with the segment, the server implements a step 212 of comparing the first difference value E1 with a second threshold S2.

When the difference E1 is less than or equal to the second threshold S2, i.e. when the observed difference between the observations of the measuring vehicle and the prediction made by the best alternative model does not exceed a limit value, the server retrains the model associated with the segment 101 in a retraining step 213. To this end, the server uses at least the weather-observation history for the segment 101 and the surface characteristics measured by the measuring vehicle 100 on the segment 101 to perform supervised training of the model associated with the segment. The prediction model is thus made more reliable.

Conversely, when the difference E1 is greater than the second threshold S2, the server 106 begins training a new prediction model in a step 214. This new model is trained at least using a plurality of measurements taken by vehicles on the segment and a plurality of weather observations. This new prediction model, once trained, is associated with the segment 101 in the database 108.

Figure 4:
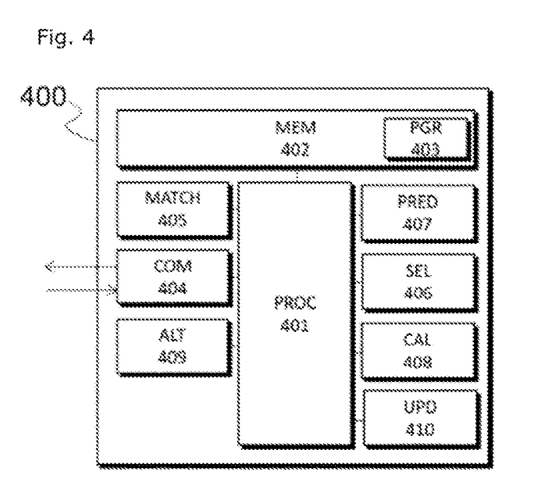
FIG. 4 shows the architecture of a device suitable for implementing the adaptive predicting method according to one particular embodiment.

FIG. 4 shows the architecture of a device 400 suitable for implementing the adaptive predicting method according to one particular embodiment.

The device 400 comprises a storage space 402, for example, a memory MEM, and a processing unit 401 that is equipped, for example, with a processor PROC. The processing unit may be controlled by a program 403, for example a computer program PGR, that implements steps 200 to 214 (described above with reference to FIG. 2) of the adaptive predicting method.

On initialization, the instructions of the computer program 403 are loaded, for example, into a RAM 402 (RAM being the acronym of random-access memory) before being executed by the processor of the processing unit 401. The processor of the processing unit 401 implements the steps of the adaptive predicting method according to the instructions of the computer program 403.

To this end, apart from the memory 402 and the processing unit 401, the device 400 comprises communication means 404, for example an Ethernet network interface or any other suitable network interface allowing the device 400 to exchange data with other devices in accordance with a communication protocol, and in particular to exchange data with connected vehicles such as the vehicle 100. The communication means 504 are configured by the instructions of the computer program 403 to receive a message containing at least one weather-related surface characteristic measured by the vehicle and a location of the vehicle at the time of the measurement. The message is for example a message in the JSON, CSV or XML format transmitted via a TCP/IP transport protocol.

The device 400 further comprises a module 405 for matching at least one location contained in the message received via the module 404 with a digital road map, in order to identify a road segment on which the surface characteristic contained in the message was measured. The module 405 is for example implemented via computer-program instructions configured to implement a map-matching algorithm allowing, in a known manner, a location datum to be matched with a segment of a road network.

The device 400 comprises a module 406 for selecting, from a plurality of prediction models, a prediction model associated with the segment identified by the module 405. To this end, the module 406 may be implemented via computer-program instructions configured to query a database containing associations between road segments and prediction models, and to obtain in reply an identifier of a prediction model associated with said segment.

The device 400 also comprises a predicting module 407. The predicting module is able to infer one particular prediction model, for example the model selected by the selecting module 406, using a weather-observation history. The module 407 comprises, for example, a neural network trained with weather-related surface-characteristic measurements performed on the segment identified by the module 405 or a segment the characteristics of which are similar and a weather-observation history obtained in a time window preceding the measurement. Such a module may be implemented via computer-program instructions able to be executed by the processor PROC of the processing unit 401.

The prediction made by the module 406 is used by a computer 408 configured to compute the value of a difference between the predicted surface characteristic and the surface-characteristic measurement received via the module 404. The computer 408 is implemented via instructions that are able to be executed by the processor of the processing unit 401 and that are for example configured to compute a difference between a water-level value measured by a measuring vehicle and a water level predicted by the neural network 407.

The device also comprises a module 409 for selecting an alternative prediction model. The module 409 comprises instructions to compare the difference value computed by the computer 408 with a particular threshold, and when the difference value is greater than the threshold, to configure the prediction module 407 and the computing module 408 so as to infer a plurality of alternative models and compute a value of the difference between the various predictions obtained by the selected alternative models and the measurements received via the communication module 404. The module 409 is further configured to determine, by comparing the difference values computed for each alternative model, the alternative model the predictions of which differ least from the measured characteristics.

The device 400 also comprises an updating module 410. The module 410 is implemented via instructions configured to associate with the segment identified by the module 405 the alternative model the predictions of which differ least from the measured characteristics received via the module 404. To this end, the module 410 for example makes an SQL query to a database with a view to modifying the association of the segment and prediction model.

The communication module 404 is further configured to transmit a prediction made by the prediction module 407, by inference, using the alternative model associated with the segment by the module 410, on the basis of a weather-observation history of the segment.

According to one particular embodiment, the device is implemented in a server.

The invention claimed is:

1. An adaptive method for predicting a weather-related characteristic of a surface of a segment of a road network, the method comprising:
   receiving, from a measuring vehicle,
      a location of the measuring vehicle, and
      a second weather-related characteristic of the surface of the road segment, which second characteristic is measured by a sensor of the measuring vehicle at said location;
   determining a road segment on which the first vehicle is traveling on the basis of the received location;
   selecting, from a plurality of prediction models, a first prediction model associated with the determined road segment;
   predicting a first weather-related surface characteristic by applying the first prediction model to a weather-observation history obtained for the determined segment;
   computing a first value E1 representative of the difference between the first weather-related characteristic predicted for the road segment and the second weather-related characteristic measured by the measuring vehicle; and
   when the computed first value E1 is greater than a first threshold:
      predicting a second weather-related characteristic by applying at least one second prediction model to the weather-observation history of the determined segment,
      computing a second value E2 representative of the difference between the weather-related characteristic measured by the measuring vehicle and the predicted second weather-related characteristic;
   when the second value E2 is less than the first value E1, associating the second prediction model with the road segment; and
   transmitting, to at least one second vehicle traveling on the segment, a weather-related surface characteristic predicted by applying the prediction model associated with the segment to the weather-observation history of the segment.

2. The method as claimed in claim 1, wherein when the first value E1 is less than or equal to the second value E2, and comprised between the first threshold S1 and a second threshold S2, the first prediction model is retrained using the weather-observation history of the segment and surface characteristics measured by the measuring vehicle.

3. The method as claimed in claim 2, further comprising, when the first value E1 is less than or equal to the second value E2 and greater than the second threshold S2:
- training a third prediction model using a plurality of weather-observation histories and a plurality of surface characteristics measured by at least one measuring vehicle, and
- associating the third model with the road segment.

4. The method as claimed in claim 2, wherein the first and second thresholds are defined depending on a value representative of the reliability of the measurement of the second weather-related surface characteristic by the measuring vehicle.

5. The method as claimed in claim 1, wherein the weather-forecast history is obtained for a time window the duration of which varies as a function of a contextual datum.

6. A non-transitory processor-readable data medium on which is stored a computer program comprising instructions for executing a predicting method as claimed in claim 1.

7. An adaptive device for predicting a weather-related characteristic of a surface of a segment of a road network, comprising a communication interface, a processor and a memory, the processor and the communication interface being configured by instructions stored in the memory and being configured to implement:
- receiving, from a measuring vehicle,
  - a location of the measuring vehicle, and
  - a second weather-related characteristic of the surface of the road segment, which second characteristic is measured by a sensor of the measuring vehicle at said location;
- determining a road segment on which the first vehicle is traveling on the basis of the received location;
- selecting, from a plurality of prediction models, a first prediction model associated with the determined road segment;
- predicting a first weather-related surface characteristic by applying the first prediction model to a weather-observation history obtained for the determined segment;
- computing a first value E1 representative of the difference between the first weather-related characteristic predicted for the road segment and the second weather-related characteristic measured by the measuring vehicle; and
- when the computed first value E1 is greater than a first threshold:
  - predicting a second weather-related characteristic by applying at least one second prediction model to the weather-observation history of the determined segment,
  - computing a second value E2 representative of the difference between the weather-related characteristic measured by the measuring vehicle and the predicted second weather-related characteristic;
- when the second value E2 is less than the first value E1, associating the second prediction model with the road segment; and
- transmitting, to at least one second vehicle traveling on the segment, a weather-related surface characteristic predicted by applying the prediction model associated with the segment to the weather-observation history of the segment.

8. A server comprising such a predicting device as claimed in claim 7.

* * * * *